United States Patent [19]

Kuhn et al.

[11] Patent Number: 4,721,532

[45] Date of Patent: Jan. 26, 1988

[54] REMOVAL OF IRON FOULING IN COOLING WATER SYSTEMS

[75] Inventors: Vincent R. Kuhn, Twin Lakes, Wis.; Philip R. Engelhardt, Lake Zurich; Wayne A. Mitchell, Crystal Lake, both of Ill.

[73] Assignee: W. R. Grace & Co., New York, N.Y.

[21] Appl. No.: 885,348

[22] Filed: Jul. 22, 1986

Related U.S. Application Data

[63] Continuation-in-part of Ser. No. 762,229, Aug. 5, 1985, abandoned.

[51] Int. Cl.$^4$ ............................................. C23G 1/02
[52] U.S. Cl. ............................................. 134/3; 134/41; 210/698; 252/82
[58] Field of Search ............... 134/3, 26, 28, 41; 210/698, 701; 252/82, 180, 527, 546; 122/16, 17

[56] References Cited

U.S. PATENT DOCUMENTS

| | | | |
|---|---|---|---|
| Re. 23,766 | 1/1954 | Bersworth | 260/518 |
| Re. 23,767 | 1/1954 | Bersworth | 260/518 |
| Re. 23,904 | 12/1954 | Bersworth | 260/518 |
| Re. 23,905 | 12/1954 | Bersworth | 260/518 |
| Re. 30,796 | 11/1981 | Lesinski | 134/2 |
| 2,249,757 | 7/1941 | Flett | 260/512 R |
| 2,532,391 | 12/1950 | Bersworth | 260/404.5 |
| 2,624,757 | 1/1953 | Bersworth | 562/448 |
| 2,673,213 | 3/1954 | Bersworth | 260/502.5 R |
| 2,717,263 | 12/1955 | McKinney et al. | 560/39 |
| 2,794,818 | 6/1957 | Bersworth | 556/116 |
| 2,967,196 | 1/1961 | Kroll et al. | 71/1 |
| 3,005,848 | 10/1961 | Knell | 562/448 |
| 3,038,793 | 6/1962 | Kroll et al. | 71/1 |
| 3,110,679 | 11/1963 | Rubin | 252/546 |
| 3,293,176 | 12/1966 | White | 210/698 |
| 3,308,065 | 3/1967 | Lesinski | 252/82 |
| 3,394,174 | 7/1968 | Feigin | 260/509 |
| 3,463,799 | 8/1969 | Szava et al. | 556/45 |
| 3,490,741 | 1/1970 | Teumac | 210/698 |
| 3,527,609 | 9/1970 | Vinso | 134/3 |
| 3,532,791 | 10/1970 | Johnston | 514/154 |
| 3,549,538 | 12/1970 | Jacklin | 134/3 |
| 3,684,720 | 8/1972 | Richardson | 252/86 |
| 3,742,002 | 6/1973 | Ohlson et al. | 71/97 |
| 3,754,990 | 8/1973 | Teumac et al. | 134/2 |
| 3,796,667 | 3/1974 | Block et al. | 252/180 |
| 3,806,459 | 4/1974 | Petrey | 134/41 |
| 3,898,037 | 8/1975 | Lange et al. | 134/3 |
| 3,929,874 | 12/1975 | Beerman et al. | 562/564 |
| 3,965,027 | 6/1976 | Boffardi et al. | 252/180 |
| 3,988,367 | 10/1976 | Gaudette et al. | 562/565 |
| 4,011,171 | 3/1977 | Lorenc et al. | 252/180 |
| 4,020,016 | 4/1977 | Sokol | 252/546 |
| 4,069,249 | 1/1978 | Gaudette et al. | 260/519 |
| 4,130,582 | 12/1978 | Petree et al. | 562/448 |
| 4,144,185 | 3/1979 | Block | 210/698 |
| 4,152,345 | 5/1979 | Gaudette et al. | 71/91 |
| 4,181,672 | 1/1980 | Pepper et al. | 556/50 |
| 4,190,463 | 2/1980 | Kaplan | 134/3 |
| 4,197,091 | 4/1980 | Gainer | 44/66 |
| 4,225,502 | 9/1980 | Gaudette et al. | 558/390 |
| 4,338,460 | 7/1982 | Gaudette et al. | 562/448 |
| 4,387,244 | 6/1983 | Scanlon et al. | 562/448 |
| 4,454,046 | 6/1984 | Wallace et al. | 210/698 |
| 4,566,972 | 1/1986 | Bennison | 210/698 |

OTHER PUBLICATIONS

Ciba-Geigy AG, Disclosure DT-2236783, Ciba, 29-0-7-71.

*Primary Examiner*—Peter Hruskoci
*Attorney, Agent, or Firm*—David E. Heiser

[57] ABSTRACT

Removing iron fouling from heat transfer surfaces of cooling water systems with an aqueous solution of certain alkylene amine carboxyl polyacids, or water soluble salts thereof, at a pH of 5–9.

50 Claims, No Drawings

REMOVAL OF IRON FOULING IN COOLING WATER SYSTEMS

This is a continuation-in-part of U.S. patent application Ser. No. 762,229 filed Aug. 5, 1985, now abandoned.

FIELD OF THE INVENTION

This invention relates to cleaning aqueous cooling water systems and particularly to the removal of iron fouling from the heat transfer surfaces of cooling water systems using an aqueous solution having a near-neutral pH.

BACKGROUND OF THE INVENTION

The internal metallic surfaces of cooling water systems, particularly ferrous surfaces, tend to pick up iron fouling, which may be compounded with scaling from hard water (calcium and magnesium scale). This fouling forms an insulating layer which not only reduces heat flow from the system (e.g., tubes) outward into the cooling medium, but also reduces volume capacity of the heat-exchanger and can promote corrosion. Hence the fouling must be removed periodically if the original design capacity of the system is to be maintained. Various cleaning procedures are known, e.g., use of hydrochloric acid (which removes Fe as soluble $FeCl_3$), or citric acid or ammonium citrate (which removes Fe as a water-soluble complex). For either of these prior systems to be effective, the system must be shut down during cleaning, followed by water flush. The HCl-cleaning is particularly disadvantageous in this respect, since the very low pH requires vigilance to avoid damage to ferrous internals. In contrast, the instant invention functions very effectively in a near-neutral pH range (about 5-9), thereby permitting on-stream cleaning.

Certain alkylene amine carboxylic acids are known for use in removal of iron fouling in boilers. (Cf. U.S. Pat. No. Re. 30,796.) However, the problems encountered in cleaning boilers and in cleaning cooling water systems are generally markedly different. Boiler water systems operate at high water temperatures (above 220° F.) and generally at high alkalinity (pH about 10 to 12). Hardness control is generally practiced. Nevertheless, the high pH and temperatures of boilers drive the residual calcium ions from the boiler water. While the calcium hardness of circulating boiler water itself is thus expected to be low, the prevalent operating conditions make boiler water systems subject to scaling with calcium-rich deposits. Moreover, oxygen levels are generally kept very low in boiler water systems to minimize oxygen induced corrosion. In contrast, many cooling water systems operate at lower water temperatures (i.e. about 70° F. to about 150° F, typically fluctuating between inlet water temperatures of about 90°-105° F., and outlet water temperatures of 140°-150° F.) and lower alkalinity (pH about 6 to 9.5). Cooling water systems are generally subject to at least some aeration and oxygen levels are thus relatively high. Because of the relatively low alkalinity and high oxygen concentration, cooling water systems are prone to oxidation and corrosion. Iron-rich deposits are thus formed and the iron fouling associated with cooling water systems generally includes both solids picked up from the system water and surface oxidation of metal apparatus containing iron. Moreover, waters high in calcium hardness as well as waters low in calcium hardness may generally be successfully used as cooling water; and it is common to find waters relatively high in calcium hardness circulating within a cooling water system without substantial reduction in calcium levels.

Because the iron deposits generally found in cooling systems can be substantially different in character from those found in boiler systems, the cleaning methods are generally also different. As noted in U.S. Pat. No. 4,190,463, calcium hardness (with some Fe) predominates in boilers, whereas in cooling water systems Fe predominates, with some calcium scaling. The molecular composition of the fouling complexes of course varies in the two cases, and different cleaning procedures and cleaning compositions are generally therefore employed. As is well known in the art, cleaning compounds that work in boiler systems cannot necessarily be expected to work in cooling water systems, and vice versa. For example, it is reported that alkali metal salts of ethylenediamine tetraacetic acid (EDTA) are ineffective in boiler water treatment at a pH greater than 8 (U.S. Pat. No. Re. 30,796, column 1, lines 35-40; column 3, lines 64ff; and column 4, line 9). On the other hand, EDTA and its salts give excellent results in the cooling water of the instant invention, at least where low pH and low-calcium waters are used.

Other references: U.S. Pat. No. 4,454,046 teaches treatment of boiler water with hydroxyethylethylene diaminetriacetic acid. U.S. Pat. No. 4,190,463 teaches removal of iron deposits on cooling water surfaces with hydrolyzable tanning extracts, followed by citric acid treatment. U.S. Pat. No. 3,110,679 teaches a rust-removing composition containing N,N-di-(o-hydroxybenzyl) ethylene diaminediacetic acid. U.S. Pat. No. 3,754,990 refers to N,N-di-(beta-hydroxyethyl) glycine as a chelating agent for ferrous metals. Additionally, the following U.S. patents refer to alkylene polyamine polycarboxylic acids as metal sequestrants: U.S. Pat. Nos. 3,308,065; 3,929,874; 3,965,027; 4,011,171; and 4,020,016.

DEFINITIONS

Herein, the following definitions are used.

(1) Heat transfer surfaces of cooling water systems refers to surfaces of apparatus which contact relatively cool flowing water used to cool flowing hot water or other hot fluids, or process equipment. Typical of such systems are industrial heat exchangers composed of bundles of ferrous metal tubes. Such systems are generally cooled by contact with the cool water (which of course is warmed by the contact). The warmed water is itself thereafter cooled in, e.g., a cooling tower, and is recycled to the heat exchanger. In some instances the heat exchanger is cooled by air fans. The term excludes boiler water systems, where exterior heat is applied across ferrous tube(s).

(2) Iron fouling refers to deposits, crusts, and/or scale of iron compounds that build up on the internals of heat transfer surfaces of cooling water systems. This iron can be present in various forms, including the oxides ($Fe_2O_3$, $Fe_3O_4$), the hydroxides, and (in the presence of hard water) may include complex forms bound with calcium and/or magnesium. At start-up of the apparatus (before fouling can result from water contact) the fouling may consist simply of mill scale, i.e., $Fe_2O_3$ or magnetic iron oxide.

(3) On-stream cleaning refers to removal of iron fouling while the heat transfer system is in standard use, without shut-down for removal of the cleaning solution or for flushing the cleaned system.

(4) Alkylene amine carboxyl polyacid (AACP) refers to a compound having at least one amine group in which at least two carbons attach to the amine nitrogen, and having a plurality of acid groups, at least one of the acid groups being a carboxyl. The term includes the compound in the form of its sodium or potassium salt, as well as its acid form. Most of these compounds (as herein contemplated) have more than one carboxyl group, and thus the term includes alkylene amine polycarboxylic acids (APAs). Most of the APAs in turn include more than one amine group; thus the AACPs also include the alkylene polyamine polycarboxylic acids. The term includes all the individual compounds specified as useful in this instant application. The alkylene amine carboxyl polyacids used in the present invention are well-known in the chelating art. See, e.g., U.S. Pat. No. Re. 30,796.

The names of the relevant AACP compounds are on occasion abbreviated herein, as follows (given in acid form):

TMHBED is N,N—di (2-hydroxybenzyl)-trimethylene-diamine-N,N—diacetic acid,

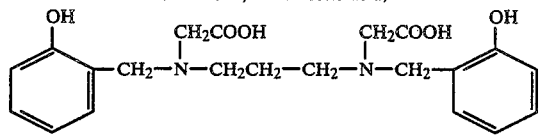

EDDHMA is N,N—ethylene-bis ((2-hydroxy-4-methyl phenyl) glycine),

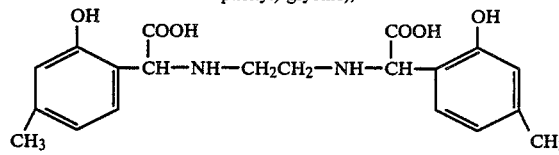

Hamplex DPS is N,N—di-(2-hydroxy-5-sulfonic acid benzyl) glycine,

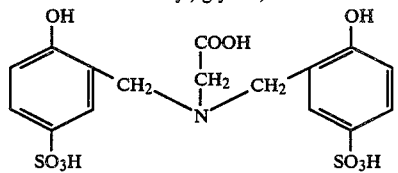

Hamp-OL is N—hydroxyethylethylenediamine triacetic acid,

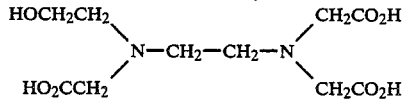

Hamp-Ex Acid is diethylenetriamine pentaacetic acid,

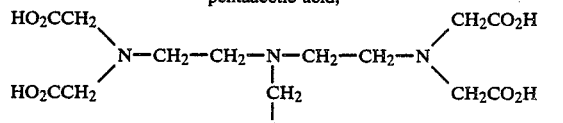

(Note: Hamplex DPS, Hamp-OL, and Hamp-Ex Acid are trademarks of W. R. Grace & Co.)

EDTA is ethylenediamine tetraacetic acid.
NTA is nitrilotriacetic acid.

(5) AACP concentrate refers to a concentrated aqueous solution of AACP in Na or K salt form, suitable for use in large scale heat exchange installations.

SUMMARY OF THE INVENTION

We have found that certain alkylene amine carboxyl polyacids (AACPs) are effective in removing iron fouling from surfaces of cooling water systems while the system water is maintained at a near neutral pH. The alkylene amine polyacids are particularly suited for on stream cleaning of heat transfer surfaces in industrial heat exchangers. They can also be used for cleaning iron deposits and corrosion products from fouled or corroded metal surfaces in other cooling water systems such as internal combustion engine cooling systems.

It is an object of this invention to provide a means for efficiently cleaning iron fouling from surfaces, including heat transfer surfaces, of cooling water systems.

It is another object of this invention to provide a means for cleaning ferrous cooling water systems while they remain operational.

It is a further object of this invention to provide a means for cleaning iron fouling from cooling water systems which is useful within a range of near neutral pH conditions.

These and other objects and advantages of the present invention will become apparent from the detailed description of the invention which follows.

DETAILED DESCRIPTION OF THE INVENTION

This invention is directed to AACPs which are useful in removing iron-rich fouling from the heat transfer surfaces of cooling water systems at near-neutral pH. The iron fouling generally includes iron from the water circulated through the cooling system during circulation which deposits on the heat transfer surfaces. The invention is particularly suited for industrial heat exchangers where these deposits are generally found on surfaces operating at temperatures below about 210° F., typically in the range of 150° F. to 200° F., and often about 180° F. or less.

The AACPs useful in removing such deposits from cooling water systems at near-neutral pH have been found to include APAs such as EDTA, NTA, TMHBED, and Hamp-OL. However, some APAs such as EDTA nad NTA are known to attack metallic iron as well as its polyvalent oxides and thus themselves may contribute to corrosion and/or oxidation of ferrous metals, particularly at pH near 7 or below. In general, therefore (and especially when on-stream cleaning is practiced over long periods of time), the AACPs used to remove iron fouling from ferrous surfaces should be those which have a strong attraction for polyvalent iron. APAs of this type include those selected from the alkylene polyamine polycarboxylic acids represented by the structrual formulas:

(FORMULA A)

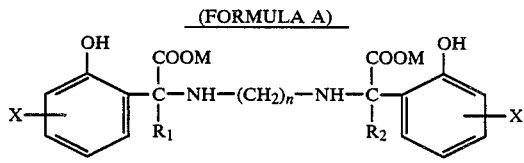

wherein $R_1$, $R_2$, and each X may be the same or different and are each selected from the group consisting of hydrogen, methyl and ethyl, wherein each M is selected from the group consisting of hydrogen, sodium or potassium, and wherein n is an integer from 2 to 5; and,

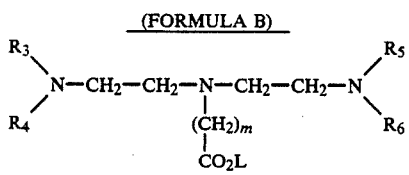

(FORMULA B)

wherein $R_3$, $R_4$, $R_5$ and $R_6$ may be the same or different and are each selected from the group consisting of hydrogen or $-CH_2COOL$, at least one of $R_3$, $R_4$, $R_5$ and $R_6$ being $-CH_2COOL$, wherein each L is selected from the group consisting of hydrogen, sodium, or potassium, and wherein m is an integer from 1 to 5.

In Formula A, both X groups are preferably either hydrogens or methyls situated in the para position relative to the alkylene amine group; most preferably said para methyls. The preferred valve for n is 2, and the preferred M substituents are sodium and potassium, most preferably sodium; and consequently, examples of preferred Formula A compounds used in this invention are the sodium salts of N,N'-ethylene-bis ((2-hydroxyphenyl) glycine), and N,N'-ethylene-bis ((2-hydroxy-4-methyl phenyl) alanine). Preferably $R_1$ and $R_2$ are hydrogen and a particularly preferred compound is EDDHMA.

In Formula B, $R_3$, $R_4$, $R_5$ and $R_6$ are all preferably $-CH_2COOL$ groups, n is 1, and the L substituents are either sodium or potassium, most preferably sodium. Consequently, another particularly preferred compound is the sodium salt of Hamp-Ex Acid.

Also useful for this invention are AACPs having the structural formula:

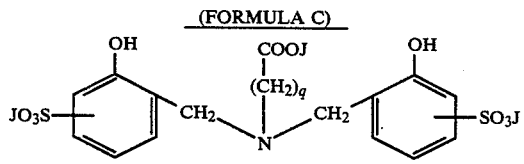

(FORMULA C)

wherein each J is selected from the group consisting of hydrogen, ammonium, sodium, or potassium, and wherein q is an integer from 1 to 5. Examples of these compounds are N,N-di-(2-hydroxy-5-sulfonic acid benzyl)-3-amino propionic acid; and N,N-di-(2-hydroxy-5-sulfonic acid benzyl)-4-amino butanoic acid.

Preferably, each J is sodium or potassium (most preferably sodium), q is 1, and the sulfonic acid groups are situated in the para position relative to the alkylene amine group. A particularly preferred compound is thus the sodium salt of Hamplex DPS.

For removing iron fouling from the heat transfer surfaces of industrial heat exchangers and the like, an aqueous solution of the alkylene amine carboxyl polyacid or its ammonium, sodium, or potassium salt is used. The solution of AACP is operable at concentrations in the range of about 0.1 ppm (lower limit) up to the solubility point of the compound. For economic reasons, the range of about 1 to 250 ppm is preferred. In commercial operation the AACP is added in concentrated aqueous solution to the chemical feed line of the cooling apparatus, until the concentration within the system reaches the desired ppm range. The preferred AACP concentrate contains about 25-35 weight percent AACP as the sodium salt. The addition can be made to water of substantially any temperature in the heat exchange system. Water being heat-exchanged in typical cooling water systems enters the system generally at 90° to 105° F. (32° to 41° C.). The water is generally under a mild pressure head. The cleaning operation is allowed to proceed without shut-down during the usual operation of the cooling system. Samples are withdrawn from time to time to analyze for Fe. A portion of the recycling Fe-containing water can be withdrawn toward the end of the cleaning cycle, with simultaneous addition of make-up water at the make-up port. Withdrawal can be intermittent or continuous. Cleaning can of course be done during shut-down, with or without water flush, but the invention does not necessitate this.

Practice of the invention will become further apparent from the following non-limiting examples.

EXAMPLES

The apparatus used (and described below) was specially designed for testing Fe fouling and monitoring attempts to remove it under control conditions and with specific agents, including the AACP materials of this invention.

Tests were conducted using a steam heated dynamic scale tester. The stainless steel heat transfer tube was initially fouled with a ferric chloride solution. This was done by recirculating the solution past the heat transfer tube at a skin temperature of about 180° F. After an appreciable amount of iron was deposited, the water was drained and excess deposited iron in the basin, tubes and pump was removed. Fresh test water was added to the basin and circulated at about 2 liters per minute with an outlet water temperature of 140°-150° F. A level control switch in conjunction with a solenoid valve for controlling the addition of deionized water was used to compensate for evaporation losses.

Treatments were evaluated at three pH levels: 9.0, 7.5-8.0 and 6.0. Since the iron concentration from a blank run showed little change over the pH range of 9.0 to 6.0, a blank run at a pH of 9.0 represented the equilibrium iron concentration before the addition of treatment. Treatment was added once and the iron concentration measured at 24-hour intervals at the three pH levels. The sample of water for iron analysis was unfiltered and acidified to represent soluble and dispersed iron. Thus a comparison of the iron concentration before and after the addition of treatment measured the performance of that treatment.

The initial screening was done in ionized water at the three pH levels.

TABLE I

| | On-Stream Cleaning of Iron in Deionized Water | | | | | | |
|---|---|---|---|---|---|---|---|
| Treatment | Dosage, ppm | pH | Iron, ppm | pH | Iron, ppm | pH | Iron, ppm |
| Blank | 0 | 9.0 | 0.16 | 7.8 | 0.14 | 6.0 | 0.18 |
| TMHBED Na4 | 50 | 8.9 | 0.15 | 7.6 | 0.35 | 6.1 | 0.57 |
| EDDHMA Na4 | 50 | 9.1 | 0.78 | 8.0 | 1.32 | 6.2 | 2.03 |
| Na2EDTA.2H2O | 50 | 9.0 | 0.43 | 8.0 | 0.38 | 6.1 | 0.25 |
| Na3NTA.H2O | 50 | 9.0 | 0.23 | 7.9 | 0.22 | 6.2 | 0.57 |
| Hamplex DPS | 50 | 9.0 | 0.20 | 7.8 | 0.30 | 6.2 | 0.54 |
| Hamp-OL | 50 | 9.0 | 0.25 | 7.9 | 1.13 | 6.0 | 6.6 |
| Hamp-Ex Acid (Na) | 50 | 8.8 | 0.19 | 7.6 | 0.35 | 6.0 | 0.87 |
| Citric Acid | 50 | 8.6 | 0.05 | 7.7 | 0.08 | 6.2 | 0.19 |

Note that there is a general trend for the AACPs of this invention and particularly TMHBED, sodium salt, to become less effective in removing fouling as the pH approached 9. The method of this invention, therefore, is generally practiced at a pH below about 9. Preferably, for rapid cleaning, particularly where TMHBED is used, the pH should be kept at within the range of 5 to 8. However, as evidenced by the surprising effectiveness of EDDHMA even at a pH of about 9, Formula A compounds are particularly useful for cleaning cooling systems at pH 8 and above.

The next step was to evaluate the above treatments in the presence of hardness. This was done at pH 6.0 with two different waters, Composition A and Composition B. Composition A water contains 187 ppm calcium hardness as $CaCO_3$ and 312 ppm total hardness as $CaCO_3$. Composition B water contains 500 ppm calcium hardness as $CaCO_3$ and 828 ppm total hardness as $CaCO_3$. The effectiveness of iron removal is demonstrated in Tables II and III.

TABLE II

On-Stream Cleaning of Iron in Composition A Water

| Treatment | Dosage, ppm | pH | Iron, ppm |
|---|---|---|---|
| Blank | 0 | 6.0 | <0.05 |
| TMHBED $Na_4$ | 50 | 6.1 | 1.06 |
| EDDHMA $Na_4$ | 50 | 6.1 | 1.53 |
| $Na_2EDTA.2H_2O$ | 50 | 6.3 | 0.46 |
| $Na_3NTA.H_2O$ | 50 | 5.8 | 0.55 |
| Hamplex DPS | 50 | 6.1 | 0.46 |
| Hamp-OL | 50 | 6.1 | 0.95 |
| Hamp-Ex Acid | 50 | 6.2 | 1.04 |

TABLE III

On-Stream Cleaning of Iron in Composition B Water

| Treatment | Dosage, ppm | pH | Iron, ppm |
|---|---|---|---|
| Blank | 0 | 6.0 | <0.05 |
| TMHBED $Na_4$ | 50 | 5.9 | 1.15 |
| EDDHMA $Na_4$ | 50 | 5.8 | 5.00 |
| $Na_2EDTA.2H_2O$ | 50 | 5.6 | 1.10 |
| $Na_3NTA.H_2O$ | 50 | 6.0 | 0.37 |
| Hamplex DPS | 50 | 6.0 | 0.54 |
| Hamp-OL | 50 | 6.0 | 1.43 |
| Hamp-Ex Acid | 50 | 6.3 | 1.44 |

The effect of hardness on the APAs which are considered relatively non-iron specific (eg. EDTA and NTA) may not appear completely conclusive from Tables II and III. However, the effect of calcium ion competition is believed detrimental to use of these APAs to remove iron deposits in hard water. This is more evident from the next test where the effectiveness of the treatments to remove iron was determined over a period of 7 days in Composition B water, pH at about 6.0 and outlet temperature of about 140° F.-150° F.

The results are shown in Table IV.

TABLE IV

Evaluation over 7-Day Period

| Treatment & Active Dosage | Water Comp. | Test Period | pH | To, °F. | Iron, ppm |
|---|---|---|---|---|---|
| Before adding treatment | B | | 6.1 | 140 | <0.05 |
| TMHBED, 50 ppm active as acid | | 1 Day | 5.9 | 144 | 0.29 |
| | | 2 Days | 6.0 | 144 | 0.44 |
| | | 3 Days | 6.0 | 144 | 0.59 |
| | | 6 Days | 5.9 | 144 | 0.82 |
| | | 7 Days | 5.8 | 144 | 0.89 |

TABLE IV-continued

Evaluation over 7-Day Period

| Treatment & Active Dosage | Water Comp. | Test Period | pH | To, °F. | Iron, ppm |
|---|---|---|---|---|---|
| Before adding treatment | B | | 6.0 | 143 | <0.05 |
| EDDHMA $Na_4$, 50 ppm active as acid | | 1 Day | 6.2 | 148 | 0.44 |
| | | 2 Days | 6.0 | 145 | 0.75 |
| | | 3 Days | 6.0 | 144 | 1.00 |
| | | 6 Days | 6.0 | 142 | 1.56 |
| | | 7 Days | 6.2 | 142 | 1.61 |
| Before adding treatment | B | | 6.0 | 142 | 0.10 |
| $Na_2EDTA.2H_2O$, 50 ppm active as acid | | 1 Day | 6.0 | 145 | 0.06 |
| | | 2 Days | 6.1 | 141 | 0.10 |
| | | 3 Days | 6.2 | 145 | 0.12 |
| | | 7 Days | 6.2 | 145 | 0.24 |
| Before adding treatment | B | | 5.9 | 139 | <0.05 |
| $Na_3NTA.2H_2O$, 50 ppm active as acid | | 1 Day | 5.8 | 140 | 0.21 |
| | | 4 Days | 6.2 | 144 | 0.35 |
| | | 5 Days | 6.0 | 144 | 0.35 |
| | | 6 Days | 6.0 | 133 | 0.36 |
| | | 7 Days | 6.1 | 144 | 0.37 |
| Before adding treatment | B | | 6.2 | 145 | <0.05 |
| Hamp-OL, 50 ppm active as acid | | 1 Day | 6.1 | 145 | 0.18 |
| | | 2 Days | 6.0 | 143 | 0.24 |
| | | 6 Days | 6.1 | 141 | 0.91 |
| | | 7 Days | 5.9 | 138 | 0.98 |
| Before adding treatment | B | | 6.0 | 141 | <0.05 |
| Hamp-Ex Acid, 50 ppm active as acid | | 3 Days | 5.9 | 143 | 1.24 |
| | | 4 Days | 6.0 | 139 | 1.52 |
| | | 5 Days | 6.0 | 140 | 1.50 |
| | | 6 Days | 5.8 | 136 | 2.10 |
| | | 7 Days | 5.8 | 142 | 1.97 |

The preferred compounds of this invention should be effective in removing iron fouling at calcium hardness of at least about 500 ppm. It is evident from Table IV that of the compounds tested EDDHMA and Hamp-Ex acid can be used most effectively under these hardness conditions, and that TMHBED and Hamp-OL were also effective; all of them substantially outperforming EDTA and NTA.

Surface oxidation and corrosion of iron-containing apparatus is often a component of the fouling encountered in cooling water systems. To test the effectiveness of the AACP compositions of this invention on removing iron oxides from metal surfaces, a treatment concentrate containing about 18.75 percent Hamp-Ex Acid and about 7.14 percent Hamplex DPS, as their sodium salts, was added to about 0.5 liters of demineralised water at a level of about one part concentrate to about 99 parts water. The pH of the solution was adjusted to about 8.0 to 8.5 using sodium hydroxide, and the solution was agitated in a glass flask using a magnetic stirrer. A steel coupon which had previously oxidized at its surface to form common iron oxide corrosion products was then immersed in the solution and the solution was gradually heated to boiling. About 1 hour after heat was applied, the coupon was removed and observed to be clean and completely free of iron corrosion products. Thus the mix was effective even at pH 8 and above. Other mixes, particularly those of Formula C compounds with compounds of Formula B, are considered similarly effective.

The method of this invention comprises contacting the heat transfer surfaces with an aqueous solution having a pH of at least about 5 and containing an effective amount of at least one of the compounds specified herein. The compounds used are preferably those which perform effectively at elevated hardness levels, and do not tend to corrode the ferrous metals within the pH range of the invention. Most preferably, as exemplified above, the method uses compounds which are sufficiently attracted to polyvalent iron to allow effective removal of the iron-rich deposits of the cooling systems without a need to first separately treat the system to remove hardness. Indeed, it is anticipated that any calcium component of the iron fouling will ordinarily also be dispersed in the treatment solution as the iron fouling is removed. As demonstrated above, mixes of these preferred compounds may be used advantageously. Indeed, the preferred AACP composition is a mix of Hamp-Ex Acid and Hamplex DPS, used in the form of the sodium salt. The material is suitably added as an AACP concentrate to the chemical feed line. The AACP concentrate may contain conventional additives such as corrosion inhibitors (e.g., mercaptobenzothiazole, tolyltriazole, benzotriazole, phosphate) and dispersants.

A suitable AACP concentrate for large scale use consists of:

| Component | Wt. % |
|---|---|
| Water | 64 |
| Hamp-Ex Acid | 19 |
| Hamplex DPS | 15 |
| Anionic dispersant | 2 |
| | 100 |

In preparing the concentrate, the Hamp-Ex Acid and Hamplex DPS are dissolved, and then the pH is adjusted to 9 with NaOH. The anionic dispersant is sulfonated styrene maleic anhydride copolymer, but other dispersants well known in the art (e.g., copolymer of 2-acrylamido-2-methylpropanesulfonic acid and methacrylic acid) are operable. Hamplex DPS is desireable in a mix not only because it provides iron removal, but because it also imparts color to the solution, and thus may be used as an indication of treatment strength. Hamplex DPS is thus considered a preferred component of mixes not only with Formula B compounds such as Hamplex Acid, but with the other APAs shown particularly effective as progressive iron removers in Table IV (i.e. Formula A compounds such as EDDHMA; and the compounds Hamp-OL and TMHBED and their equivalents).

Time (duration) of treatment is not critical, especially in the preferred on-stream mode. Suitably, treatment is continued until Fe analysis of recycling water shows Fe defouling is substantially complete. Generally this requires at least several hours, and may require several days, weeks, or even months, depending on the amount and nature of fouling, and other conditions characteristic of the particular apparatus. After defouling is fairly well completed, the circulating fluid may be gradually removed, with simultaneous make-up.

The temperature of the water being treated is not critical, it being evident that (in the general case) the hotter the water, the faster the cleaning process will proceed. Iron fouling is removed at rates acceptable for many purposes even at temperatures less than 150° F. Water in heat-exchange tube bundles flows typically at 90° to 105° F. (32° to 41° C.).

The compositions used in this invention may be used in conjunction with other materials commonly found in cooling water systems, such as corrosion inhibitors, scale inhibitors and dispersants. The compositions of this invention are particularly suited for treating industrial heat exchangers and the like where iron-containing metals, such as steel, generally constitute a substantial portion of the cooling water apparatus, and where the fouling is particularly rich in iron. However, iron-rich deposits can also form in other cooling systems which are subject to contact with oxygen and which experience similar pH and temperature conditions during operation. These other systems, such as internal combustion engine cooling systems, may be somewhat more complex with respect to their metallic components, their corrosion attributes, and their coolant composition, but the iron fouling found in those systems can also be effectively treated with the compositions of this invention.

With regard to engine cooling systems, particular mention is made that the compositions of this invention may be used in conjunction with ethylene glycol and the like, which may be present in many engine cooling systems. While these systems often operate at somewhat higher coolant and surface temperatures as well as higher coolant pH than industrial cooling water systems, iron-rich fouling similar to that in industrial cooling water is still commonly encountered. Cleaning of engine cooling systems is more likely accomplished by flushing the coolant from the system and cleaning the fouling from the heat transfer surfaces by circulating the treating solution through the system at a pH between 5 and 9 during a separate cleaning operation.

The examples describe particular embodiments of the invention. Other embodiments will be apparent to those skilled in the art from a consideration of the specification or practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A method of removing iron fouling from heat transfer surfaces of cooling water systems which comprises
   (a) contacting said surfaces with an aqueous solution containing an effective amount, totalling at least 0.1 ppm, of at least one compound of the group of alkylene amine carboxyl polyacids consisting of compounds having the formula

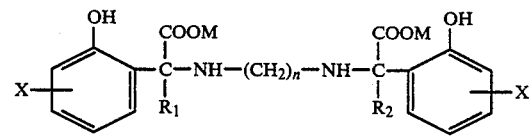

wherein $R_1$, $R_2$, and each X may be the same or different and are each selected from the group consisting of hydrogen, methyl and ethyl, wherein each M is selected from the group consisting of hydrogen, sodium or potassium, and wherein n is an integer from 2 to 5;
   (b) maintaining the solution at a pH of at least about 5, but below about 9 during removal.

2. Method according to claim 1 in which the iron fouling comprises iron oxide and calcium scale.

3. Method according to claim 1 in which the compound concentration in the contacting solution is within the range of 1 to 250 ppm.

4. Method according to claim 1 in which the fouling is removed by on-stream cleaning.

5. Method according to claim 4 in which the calcium hardness of the cooling water is at least 500 ppm.

6. Method according to claim 4 in which the cooling water in contact with the surfaces has a temperature between 90° F. and 150° F.

7. Method according to claim 4 wherein the heat transfer surfaces operate at temperatures of about 180° F. or less and in contact with cooling water having a pH within the range of 5 to 9.

8. Method according to claim 7 wherein the iron fouling consists predominantly of iron compounds deposited from said cooling water.

9. The method of claim 1 wherein the cooling water system is an industrial heat exchanger having ferrous metal tubes.

10. The method of claim 1 wherein the pH is maintained below about 8 during removal.

11. Method of claim 1 wherein the cooling water system is an internal combustion engine cooling system.

12. Method according to claim 1 in which the at least one compound comprises N,N-ethylene-bis ((2-hydroxy-4-methyl phenyl) glycine) or a salt thereof.

13. Method according to claim 1 in which the solution further comprises N,N-di (2-hydroxy-5-sulfonic acid benzyl) glycine or a salt thereof.

14. Method according to claim 1 in which the solution further comprises diethylenetriamine pentaacetic acid or a salt thereof.

15. Method according to claim 1 in which the acid and a neutralizing amount of base are added separately to the cooling system.

16. Method according to claim 1 in which a sufficient quantity of an aqueous solution containing about 25-35 wt. % of the acid as the sodium or potassium salt is added to the cooling water system to provide therein a concentration of about 1 to 250 ppm.

17. Method according to claim 1 in which the surfaces are contacted with a solution containing a mix of the acids.

18. Method according to claim 1 in which the contacting solution further contains at least one compound selected from those compounds having the formula

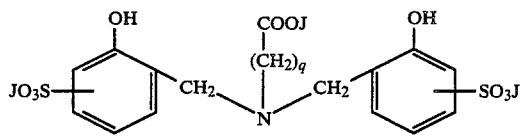

wherein each J is selected from the group consisting of hydrosen, ammonium, sodium, or potassium, and wherein q is an integer from 1 to 5.

19. Method according to claim 18 in which the solution contains a mix of acids comprising N,N-di (2-hydroxy-5-sulfonic acid benzyl) glycine, or a sodium or potassium salt thereof.

20. Method according to claim 18 in which the surfaces are contacted with a solution containing a mix comprising N,N-ethylene-bis ((2-hydroxy-4-methyl phenyl) glycine or a salt thereof.

21. Method according to claim 20 in which the solution contains a mix comprising N,N-di (2-hydroxy-5-sulfonic acid benzyl) glycine, or a sodium or potassium salt thereof.

22. Method according to claim 21 in which the mix further comprises diethylenetriamine pentaacetic acid or a sodium or potassium salt thereof.

23. Method according to claim 1 wherein the heat transfer surfaces operate at temperatures of about 180° F. or less.

24. Method according to claim 1 wherein the iron fouling consists predominantly of iron compounds deposited from cooling water.

25. Method according to claim 1 wherein the solution has a calcium hardness of at least 500 ppm.

26. A method for removing iron fouling from heat transfer surfaces of cooling water systems which comprises (a) contacting said surfaces with an aqueous solution having a calcium hardness of at least about 187 ppm as $CaCO_3$, and containing an effective amount, totalling at least 0.1 ppm, of at least one compound of the group of alkylene amine carboxyl polyacids consisting of (i) N,N-di (2-hydroxybenzyl)-trimethylenediamine-N,N-diacetic acid and water-soluble potassium and sodium salts thereof;

(ii) N-hydroxyethylethylenediamine triacetic acid and water-soluble potassium and sodium salts thereof;

(iii) compounds having the formula

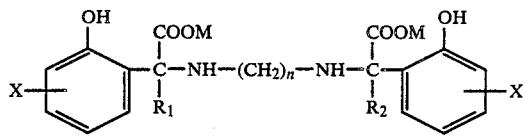

wherein $R_1$, $R_2$, and each X may be the same or different and are each selected from the group consisting of hydrogen, methyl and ethyl, wherein each M is selected from the group consisting of hydrogen, sodium or potassium, and wherein n is an integer from 2 to 5; and (iv) compounds having the formula

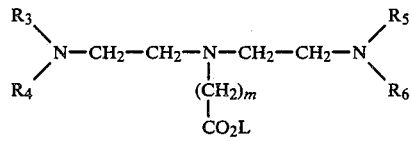

wherein $R_3$, $R_4$, $R_5$ and $R_6$ may be the same or different and are each selected from the group consisting of hydrogen or —$CH_2COOL$, at least one of $R_3$, $R_4$, $R_5$ and $R_6$ being —$CH_2COOL$, wherein each L is selected from the group consisting of hydrogen, sodium, or potassium, and wherein m is an integer from 1 to 5; and (b) maintaining the solution at a pH of about 6 during removal.

27. Method according to claim 26 in which the iron fouling comprises iron oxide and calcium scale.

28. Method according to claim 26 in which the compound concentration in the contacting solution is within the range of 1 to 250 ppm.

29. Method according to claim 26 in which the fouling is removed by on-stream cleaning.

30. Method according to claim 29 in which the calcium hardness of the cooling water is at least 500 ppm.

31. Method according to claim 29 in which the cooling water in contact with the surfaces has a temperature between 90° F. and 150° F.

32. Method according to claim 29 wherein the heat transfer surfaces operate at temperatures of about 180° F. or less and in contact with cooling water having a pH of at least about 5.

33. Method according to claim 32 wherein the iron fouling consists predominantly of iron compounds deposited from said cooling water.

34. The method of claim 26 wherein the cooling water system is an industrial heat exchanger having ferrous metal tubes.

35. Method of claim 26 wherein the cooling water system is an internal combustion engine cooling system.

36. Method according to claim 26 in which the at least one compound comprises N,N-di (2-hydroxybenzyl)-trimethylene-diamine-N,N-diacetic acid or a salt thereof.

37. Method according to claim 26 in which the at least one compound is N-hydroxyethylethylenediamine triacetic acid or a salt thereof.

38. Method according to claim 26 in which the at least one compound is diethylenetriamine pentaacetic acid or a salt thereof.

39. Method according to claim 26 in which the at least one compound comprises a compound selected from those of paragraph (a) (iv).

40. Method according to claim 26 in which the acid and a neutralizing amount of base are added separately to the cooling system.

41. Method according to claim 26 in which a sufficient quantity of an aqueous solution containing about 25–35 wt. % of the acid as the sodium or potassium salt is added to the cooling water system to provide therein a concentration of about 1 to 250 ppm.

42. Method according to claim 26 in which the surfaces are contacted with a solution containing a mix of the acids.

43. Method according to claim 26 in which the contacting solution further contains at least one compound selected from those compounds having the formula

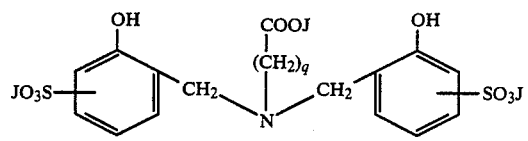

wherein each J is selected from the group consisting of hydrogen, ammonium, sodium, or potassium, and wherein q is an integer from 1 to 5.

44. Method according to claim 43 in which the solution comprises N,N-di (2-hydroxy-5-sulfonic acid benzyl) glycine or a salt thereof.

45. Method according to claim 43 in which the at least one compound comprises a compound selected from those of paragraph (a) (iv).

46. Method according to claim 45 in which the solution contains a mix comprising N,N-di (2-hydroxy-5-sulfonic acid benzyl) glycine, or a sodium or potassium salt thereof.

47. Method according to claim 46 in which the compound from paragraph (a) (iv) is diethylenetriamine pentaacetic acid or a sodium or potassium salt thereof.

48. Method according to claim 26 wherein the heat transfer surfaces operate at temperatures of about 180° F. or less.

49. Method according to claim 26 wherein the iron fouling consists predominantly of iron compounds deposited from cooling water.

50. Method according to claim 26 wherein the solution has a calcium hardness of at least 500 ppm.

* * * * *